United States Patent
Wang et al.

(10) Patent No.: US 11,372,567 B2
(45) Date of Patent: Jun. 28, 2022

(54) METHOD AND APPARATUS FOR STORING DATA

(71) Applicant: HANGZHOU HIKVISION SYSTEM TECHNOLOGY CO., LTD., Hangzhou (CN)

(72) Inventors: Wei Wang, Hangzhou (CN); Qiqian Lin, Hangzhou (CN); Weichun Wang, Hangzhou (CN)

(73) Assignee: HANGZHOU HIKVISION SYSTEM TECHNOLOGY CO., LTD., Zhejiang (CN)

(*) Notice: Subject to any disclaimer, the term of this patent is extended or adjusted under 35 U.S.C. 154(b) by 16 days.

(21) Appl. No.: 16/963,163

(22) PCT Filed: Jan. 18, 2019

(86) PCT No.: PCT/CN2019/072380
§ 371 (c)(1),
(2) Date: Jul. 17, 2020

(87) PCT Pub. No.: WO2019/141248
PCT Pub. Date: Jul. 25, 2019

(65) Prior Publication Data
US 2021/0132805 A1     May 6, 2021

(30) Foreign Application Priority Data
Jan. 18, 2018 (CN) .......................... 201810047816.8

(51) Int. Cl.
*G06F 3/00*     (2006.01)
*G06F 3/06*     (2006.01)

(52) U.S. Cl.
CPC ............ *G06F 3/064* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| 9,626,246 B1 | 4/2017 | Parkhurst |
| 2004/0075623 A1 | 4/2004 | Hartman |
(Continued)

FOREIGN PATENT DOCUMENTS

| CN | 101984397 A | 3/2011 |
| CN | 201797568 U | 4/2011 |
(Continued)

OTHER PUBLICATIONS

International search report and Written opinion in PCT application No. PCT/CN2019/072380 dated Apr. 24, 2019.
(Continued)

*Primary Examiner* — Midys Rojas
(74) *Attorney, Agent, or Firm* — Knobbe Martens Olson & Bear LLP

(57) ABSTRACT

The present disclosure relates to a method and apparatus for storing data, and belongs to the technical field of storage. The method includes: receiving a storage request carrying target data, wherein the target data includes at least one data stripe, each data stripe including a plurality of data blocks; determining, among a plurality of preset storage device groupings, a target storage device grouping for storing the target data; and storing, for each data stripe, the plurality of data blocks in the data stripe into different storage devices in the target storage device grouping respectively. The risk of data loss may be reduced by employing the present disclosure.

16 Claims, 7 Drawing Sheets

(56) References Cited

U.S. PATENT DOCUMENTS

| | | |
|---|---|---|
| 2014/0040827 A1 | 2/2014 | Shinto |
| 2016/0132280 A1 | 5/2016 | Tomonaga et al. |
| 2016/0246677 A1 | 8/2016 | Sangamkar et al. |
| 2016/0266861 A1 | 9/2016 | Kim |
| 2017/0060469 A1 | 3/2017 | Luby et al. |
| 2017/0285906 A1 | 10/2017 | Kim et al. |
| 2018/0004475 A1 | 1/2018 | Itakura et al. |

FOREIGN PATENT DOCUMENTS

| | | |
|---|---|---|
| CN | 103034457 A | 4/2013 |
| CN | 103152395 A | 6/2013 |
| CN | 103985373 A | 8/2014 |
| CN | 104580439 A | 4/2015 |
| CN | 104679665 A | 6/2015 |
| CN | 104915132 A | 9/2015 |
| CN | 105159593 A | 12/2015 |
| CN | 106201413 | 12/2016 |
| CN | 106527986 A | 3/2017 |
| CN | 106648408 A | 5/2017 |
| CN | 107454455 | 12/2017 |
| WO | 2006049506 A1 | 5/2006 |

OTHER PUBLICATIONS

First office action in Chinese application No. 201810047816.8 dated Dec. 4, 2019.

First Office Action of corresponding Chinese Patent Application No. 201810469203.3—13 pages (dated Apr. 9, 2020).

Extended European Search Report of counterpart EP Application No. 19802825.0—7 pages (dated Jul. 3, 2020).

Notification to Grant Patent Right for Invention of corresponding Chinese application No. 201810469203.3—3 pages (dated Sep. 7, 2020).

Extended European Search Report of counterpart EP Application No. 19740932.9—15 pages (dated Feb. 11, 2021).

METHOD AND APPARATUS FOR STORING DATA

CROSS-REFERENCE TO RELATED APPLICATION

This application is a national phase application based on PCT/CN2019/072380, filed on Jan. 18, 2019, which claims priority to Chinese Patent Application No. 201810047816.8, filed on Jan. 18, 2018 and entitled "METHOD AND APPARATUS FOR STORING DATA", the entire contents of which are incorporated herein by reference.

TECHNICAL FIELD

The present disclosure relates to the technical field of storage, and more particularly to a method and apparatus for storing data.

BACKGROUND

With the development of storage technology, cloud storage is applied by more and more applications to store big data. In order to ensure integrity of the data, an erasure coding technology is generally employed to perform the storage.

SUMMARY

The present disclosure provides a method and apparatus for storing data. The technical solutions are as follows.

According to a first aspect of embodiments of the present disclosure, a method for storing data is provided. The method includes:

receiving a storage request carrying target data, wherein the target data includes at least one data stripe, each data stripe including a plurality of data blocks;

determining, among a plurality of preset storage device groupings, a target storage device grouping for storing the target data; and storing, for each data stripe, the plurality of data blocks in the data stripe into different storage devices in the target storage device grouping respectively.

Optionally, receiving the storage request carrying the target data includes:

receiving a storage request carrying target data of a target monitoring point;

determining, among the plurality of preset storage device groupings, the target storage device grouping for storing the target data includes:

determining a target storage device grouping corresponding to the target monitoring point according to a corresponding relationship between monitoring points and storage device groupings.

Optionally, determining the target storage device grouping corresponding to the target monitoring point according to the corresponding relationship between the monitoring points and the storage device groupings includes:

searching for the target storage device grouping corresponding to the target monitoring point in a corresponding relationship table between the monitoring points and the storage device groupings;

or, determining the target storage device grouping corresponding to the target monitoring point according to a function between the monitoring points and the storage device groupings.

Optionally, determining the target storage device grouping corresponding to the target monitoring point according to the corresponding relationship between the monitoring points and the storage device groupings includes:

querying whether a target corresponding relationship between the target monitoring point and a corresponding storage device grouping exists in the corresponding relationship between the monitoring points and the storage device groupings that has been stored; and determining, in the case that the target corresponding relationship exists, the target storage device grouping corresponding to the target monitoring point according to the target corresponding relationship;

the method further includes:

determining, in the case that the target corresponding relationship does not exist, the target storage device grouping corresponding to the target monitoring point according to a number of monitoring points corresponding to each storage device grouping, and storing the target corresponding relationship between the target monitoring point and the target storage device grouping in the corresponding relationship between the monitoring points and the storage device groups.

Optionally, before receiving the storage request carrying the target data of the target monitoring point, the method further includes:

grouping, based on a preset rule, all the storage devices to obtain the plurality of storage device groupings; and establishing and storing the corresponding relationship between the monitoring points and the storage device groupings.

Optionally, grouping, based on the preset rule, all the storage devices to obtain the plurality of storage device groupings includes:

taking all storage devices having a same slot number in each storage server into a storage device grouping to obtain the plurality of storage device groupings; or taking all storage devices in a first preset number of storage servers into a storage device grouping to obtain the plurality of storage device groupings; and taking all storage devices having a same slot number in a second preset number of storage servers into a storage device grouping to obtain the plurality of storage device groupings.

Optionally, grouping, based on the preset rule, all the storage devices to obtain the plurality of storage device groupings includes:

selecting a storage device randomly from each storage server to constitute a storage device grouping and thereby obtain the plurality of storage device groupings.

Optionally, after storing, for each data stripe, the plurality of data blocks in the data stripe into different storage devices in the target storage device grouping respectively, the method further includes:

Recording the storage device storing each data block to obtain a corresponding relationship between the data blocks and the storage devices.

Optionally, after recording the storage device storing each data block to obtain the corresponding relationship between the data blocks and the storage devices, the method further includes:

receiving a data recovery request corresponding to a target storage device that is corrupted;

determining a target data block that is corrupted corresponding to the target storage device according to the corresponding relationship between the data blocks and the storage devices; and recovering the target data block according to other data blocks, except the target data block, in the target data stripe to which the target data block belongs, and storing a recovered target data block into a new storage device.

According to a second aspect of embodiments of the present disclosure, an apparatus for storing data is provided. The apparatus includes:

a processor; and a memory for storing instructions executable by the processor, wherein the processor is configured to:

receive a storage request carrying target data, wherein the target data includes at least one data stripe, each data stripe including a plurality of data blocks;

determine, among a plurality of preset storage device groupings, a target storage device grouping for storing the target data; and store, for each data stripe, the plurality of data blocks in the data stripe into different storage devices in the target storage device grouping respectively.

Optionally, in order to receive the storage request carrying the target data, the processor is configured to:

receive a storage request carrying the target data of a target monitoring point; and in order to determine, among the plurality of preset storage device groupings, the target storage device grouping for storing the target data, the processor is configured to:

determine a target storage device grouping corresponding to the target monitoring point according to a corresponding relationship between monitoring points and storage device groupings.

Optionally, in order to determine the target storage device grouping corresponding to the target monitoring point according to the corresponding relationship between the monitoring points and the storage device groupings, the processor is configured to:

search for the target storage device grouping corresponding to the target monitoring point in a corresponding relationship table between the monitoring points and the storage device groupings; or determine the target storage device grouping corresponding to the target monitoring point according to a function between the monitoring points and the storage device groupings.

Optionally, in order to determine the target storage device grouping corresponding to the target monitoring point according to the corresponding relationship between the monitoring points and the storage device groupings, the processor is configured to:

query whether a target corresponding relationship between the target monitoring point and the corresponding storage device grouping exists in the corresponding relationship between the monitoring points and the storage device groupings that has been stored;

determine, in the case that the target corresponding relationship exists, the target storage device grouping corresponding to the target monitoring point according to the target corresponding relationship; and determine, in the case that the target corresponding relationship does not exist, the target storage device grouping corresponding to the target monitoring point according to the number of monitoring points corresponding to each storage device grouping, and store the target corresponding relationship between the target monitoring point and the target storage device grouping in the corresponding relationship between the monitoring points and the storage device grouping.

Optionally, the processor is further configured to:

group, based on a preset rule, all the storage devices to obtain the plurality of storage device groupings; and establish and store the corresponding relationship between the monitoring points and the storage device groupings.

Optionally, in order to group, based on a preset rule, all the storage devices to obtain the plurality of storage device groupings, the processor is configured to:

take all storage devices having a same slot number in each storage server into a storage device grouping to obtain the plurality of storage device groupings; or take all storage devices in a first preset number of storage servers into a storage device grouping to obtain the plurality of storage device groupings; or take all storage devices having a same slot number in a second preset number of storage servers into a storage device grouping to obtain the plurality of storage device groupings.

Optionally, in order to group, based on a preset rule, all the storage devices to obtain the plurality of storage device groupings, the processor is configured to:

select a storage device randomly from each storage server to constitute a storage device grouping and thereby obtain the plurality of storage device groupings.

Optionally, the processor is further configured to:

record the storage device storing each data block to obtain a corresponding relationship between the data blocks and the storage devices.

Optionally, the processor is further configured to:

receive a data recovery request corresponding to a target storage device that is corrupted;

determine a target data block that is corrupted corresponding to the target storage device according to the corresponding relationship between the data blocks and the storage devices; and recover the target data block according to other data blocks, except the target data block, in the target data stripe to which the target data block belongs, and store a recovered target data block into a new storage device.

According to a third aspect of embodiments of the present disclosure, a management server is provided. The management server includes a processor and a memory that stores at least one instruction therein, wherein the processor, when loading and executing the at least one instruction, is enabled to perform the method as defined in the first aspect.

According to a fourth aspect of the embodiments of the present disclosure, a non-transitory computer-readable storage medium is provided. The storage medium stores at least one instruction therein, wherein the at least one instruction, when loaded and executed by a processor, enables the processor to perform the method as defined in the first aspect.

It should be understood that the above general description and the following detailed description are merely exemplary and explanatory, and thereby do not limit the present disclosure.

BRIEF DESCRIPTION OF THE DRAWINGS

The drawings herein are incorporated in and constitute a part of the specification. They show the embodiments consistent with the present application and are used in conjunction with the specification to explain the principles of the present application. In the accompanying drawings.

Figure 1:
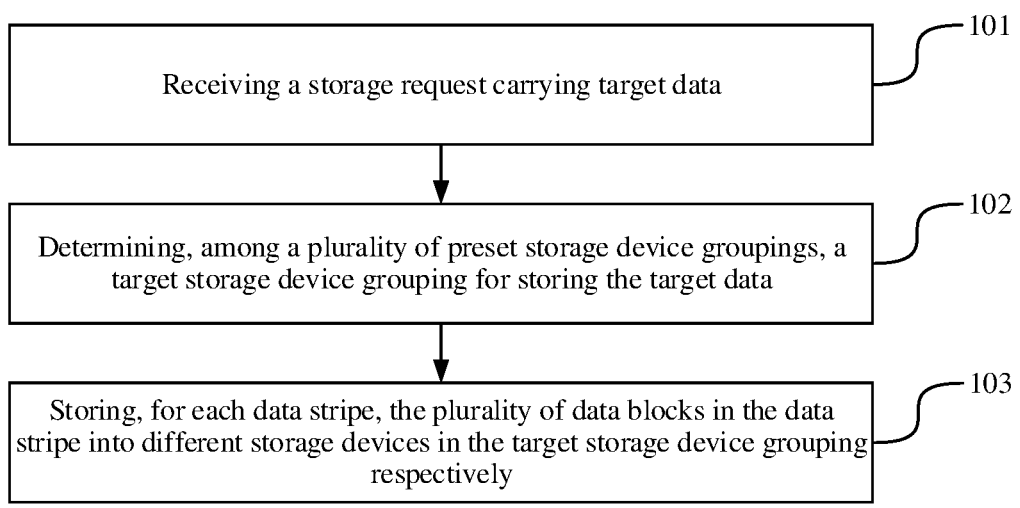
FIG. 1 is a flowchart of a method for storing data according to an exemplary embodiment.

Through the above drawings, specific embodiments of the present disclosure have been shown and will be described in more detail below. The drawings and written description are not intended to limit the scope of the concepts of the present disclosure in any way, but rather to illustrate the concepts of the present disclosure to those skilled in the art by referring to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

While performing the storage by the erasure coding technology, the data to be stored may be striped to obtain a plurality of data stripes. Each of the data stripes may be further divided into N+M data blocks, including N original data blocks and M parity data blocks, the M parity data blocks being obtained by calculating the N original data blocks by an encoding matrix. Then, the N+M data blocks are stored in storage devices of different storage servers respectively, and each of the storage devices may store data blocks of a plurality of data stripes therein. Under a circumstance that no more than M storage devices among the storage devices are corrupted or no more than M storage servers are down, if the data strips that have data blocks stored therein lost no more than M data blocks, the data blocks as lost can be obtained by calculating the remaining data blocks, which thereby ensures integrity of the data.

In the process of implementing the present disclosure, the inventor finds that the prior art has at least the following problems.

In a storage system, all of the data may be stored in the data blocks storing the data stripes of each of the storage devices, which means that the plurality of data blocks of the data stripes corresponding to all the data are randomly stored in the storage devices of the storage servers. Thus, among different storage servers, in the case that a total number of corrupted storage devices is greater than M or more than M storage servers are down, an unrecoverable corruption may be caused to all of the data, thereby causing a high risk of data loss.

An exemplary embodiment of the present disclosure provides a method for storing data that may be practiced by a management server.

The management server may include components, such as, a processor, a memory, a transceiver, and the like. The processor may be a central processing unit (CPU) or the like and configured to execute processes of dividing storage device groupings, recovering data blocks, and the like. The memory may be a random access memory (RAM), a flash, or the like and configured to store the received data, the data required during the processing, and the data generated during the processing, such as, video data of monitoring point, a corresponding relationship between monitoring points and storage device groupings, a corresponding relationship between data blocks and storage devices, and so on. The transceiver may be configured to transmit data with a terminal or other servers (such as a storage server), and may include an antenna, a matching circuit, a modem, and the like.

The storage device may be disk, Internet small computer system interface/fiber channel (ISCSI/FC) block device, network attached storage (NAS) volume, and the like, and may be installed on the storage server, which is not limited here.

As shown in FIG. 1, the processing procedure of the method may include following steps.

In step 101, a storage request carrying target data is received.

The target data includes at least one data stripe. Each data stripe includes a plurality of data blocks.

In one possible implementation, storage system may receive and store various data, such as image data, video data, and information data of each user. When there is target data that needs to be stored, management server of the storage system may receive the storage request carrying the target data.

In one possible implementation, the received data may be the video data of the monitoring point, and the corresponding processing may be as follows: receiving a storage request carrying target data of a target monitoring point.

The monitoring point refers to a place where a monitoring equipment is installed.

There are a plurality of monitoring points in a city for recording security videos all the time, which indicates that data volume of the security videos is huge. Since the security videos are rather important, a reasonable storage scheme is required to ensure the storage safety of the security videos as much as possible. In this embodiment, a storage scheme based on erasure coding is taken as an example, where the video of each monitoring point may be divided into fragments to obtain a plurality of original data blocks. Then, every N original data blocks may be calculated by encoding matrix to obtain M parity data blocks. The encoding matrix may be a Van der Monde matrix or a Cauchy matrix, which is not limited herein. Generally, the N original data blocks and the M parity data blocks may be taken as a set of data, that is, the N+M data blocks may be taken as a data stripe which is a logical unit. A data stripe may have 4+1 data blocks (i.e., 4 original data blocks and 1 parity data block), or 8+2 data blocks (i.e., 8 original data blocks and 2 parity data blocks), which is not limited herein.

The monitoring point may be equipped with a camera. During the process of recording the security video, the video data may be cached in a storage medium of the camera or a broker server. After recording for a period of time, the cached video data may be encoded by the aforesaid process and divided into a plurality of data strips. Then, the storage request carrying all data strips of the monitoring point may be sent to the management server. The following will be illustrated by taking the storage of one data stripe as an example. The storage of other data strips is same or similar, which will not be repeated later.

Optionally, before storing the data strips, the storage devices of the storage server may be grouped in advance, and the corresponding processing may be as follows: grouping, based on a preset rule, all the storage devices to obtain the plurality of storage device groupings; and establishing and storing the corresponding relationship between the monitoring points and the storage device groupings.

In one possible implementation, a plurality of storage servers may be used in the storage system to store the video data of the security videos, and the management server schedules storage tasks. Each of the storage servers and the management server may not locate at the same physical location. For example, they may not locate in a same computer room, and every two servers may communicate with each other over the network.

A storage server may include a plurality of storage devices. For example, in the case that there are 10 storage servers and each of the storage servers has 24 storage devices, there may be 240 storage devices for storing the video data. Before storing the data strips, all storage devices may be grouped according to a rule preset by technicians to obtain a plurality of storage device groupings. For example, the aforesaid 240 storage devices may be divided into 10 groups, and each of the groups has 24 storage devices. Then, respective monitoring points may be assigned to a fixed storage device grouping. That is, video data of a certain monitoring point is only stored in a fixed storage device grouping, and a storage device grouping may store video data of a plurality of monitoring points. It should be noted that, in this embodiment, monitoring points corresponding to one storage device grouping are not all monitoring points. That is, video data of all monitoring points are not stored in one storage device grouping, which may ensure that the video data of all monitoring points are stored in a distributed manner, thereby avoiding a situation that the video data of all monitoring points are all lost due to a failure of one storage device grouping. Specifically, a mapping relationship between the monitoring points and the storage device groupings may be established by a hash algorithm, and then the hash algorithm may be stored. That is, the mapping relationship between the monitoring points and the storage device groupings is stored in the management server.

Optionally, the storage device groupings may be formed horizontally or vertically, and the corresponding processing may be as follows: taking all storage devices having a same slot number in each storage server into a storage device grouping to obtain the plurality of storage device groupings; or taking all storage devices in a first preset number of storage servers into a storage device grouping to obtain the plurality of storage device groupings; or taking all storage devices having a same slot number in a second preset number of storage servers into a storage device grouping to obtain the plurality of storage device groupings.

In one possible implementation, the storage devices groupings are divided mainly based on two principles. One principle is to perform grouping horizontally, in which the fixed storage devices are divided into one group; and the other principle is to perform grouping vertically, in which the storage devices in the fixed storage servers are divided into one group.

Figure 2:
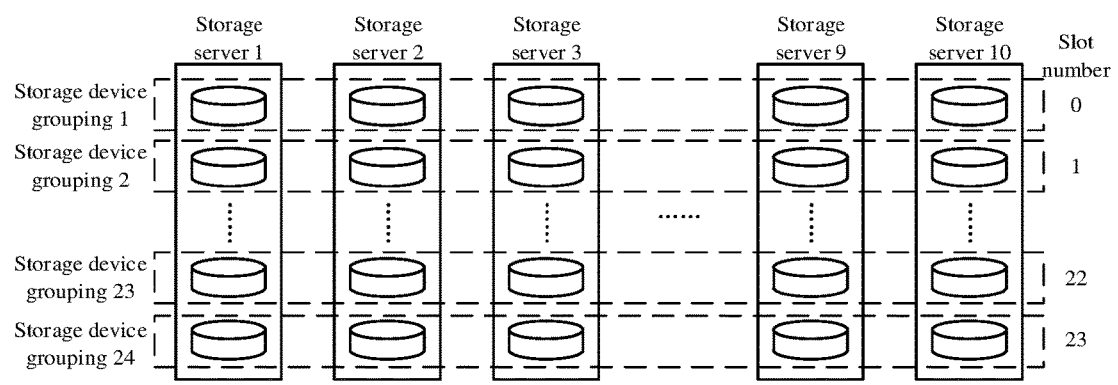
FIG. 2 is a schematic diagram of a storage device grouping according to an exemplary embodiment.

For grouping horizontally, a preferred solution is to divide all storage devices having a same slot number in each storage server into one storage device grouping. Each storage server may have a plurality of slot numbers, that is, a plurality of storage device groupings can be obtained. As shown in FIG. 2 that is a schematic diagram of the storage device groupings, the storage server has 24 slots where the storage devices are installed, and the slot numbers are 0-23 respectively. For 10 storage servers, 24 storage device groupings may be obtained by dividing the 10 storage devices in slot 0 into one storage device grouping, dividing the 10 storage devices in slot 1 into one storage device grouping, and so on. In addition to grouping based on the same slot number, it is also feasible to select a storage device randomly from each storage server to obtain a storage device grouping, and since different storage device groupings have different storage devices, a plurality of storage device groups can also be obtained, which is not limited herein.

Figure 3:
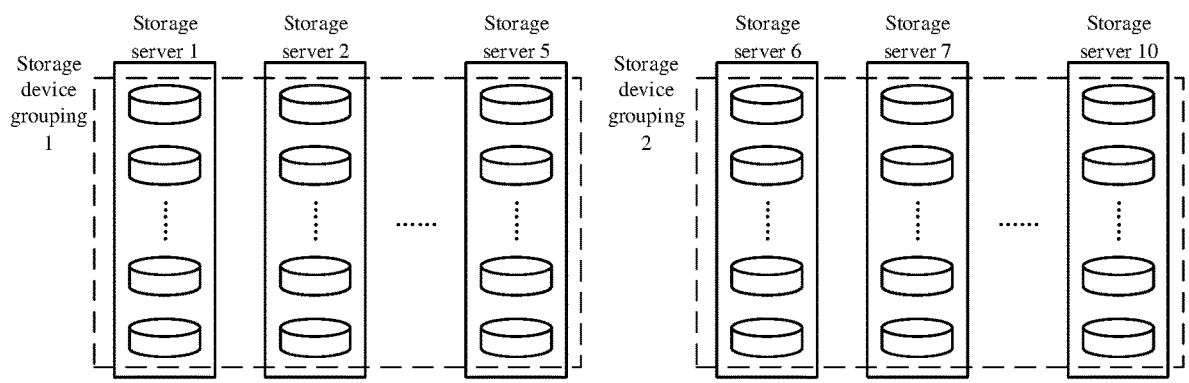
FIG. 3 is a schematic diagram of a storage device grouping according to an exemplary embodiment.

For grouping vertically, all storage devices in a preset number of storage servers may be divided into one storage device grouping, and the preset number may be determined according to composition of the data stripe. Generally, the preset number may be greater than or equal to N+M, wherein N is the number of original data blocks in a data strip, and M is the number of parity data blocks in the data strip. As shown in FIG. 3 that is a schematic diagram of the storage device groupings, for 10 storage servers, 2 storage device groupings may be obtained by dividing all storage devices in the first 5 storage servers into one storage device grouping and dividing all storage devices in the last 5 storage servers into another storage device grouping.

Figure 4:
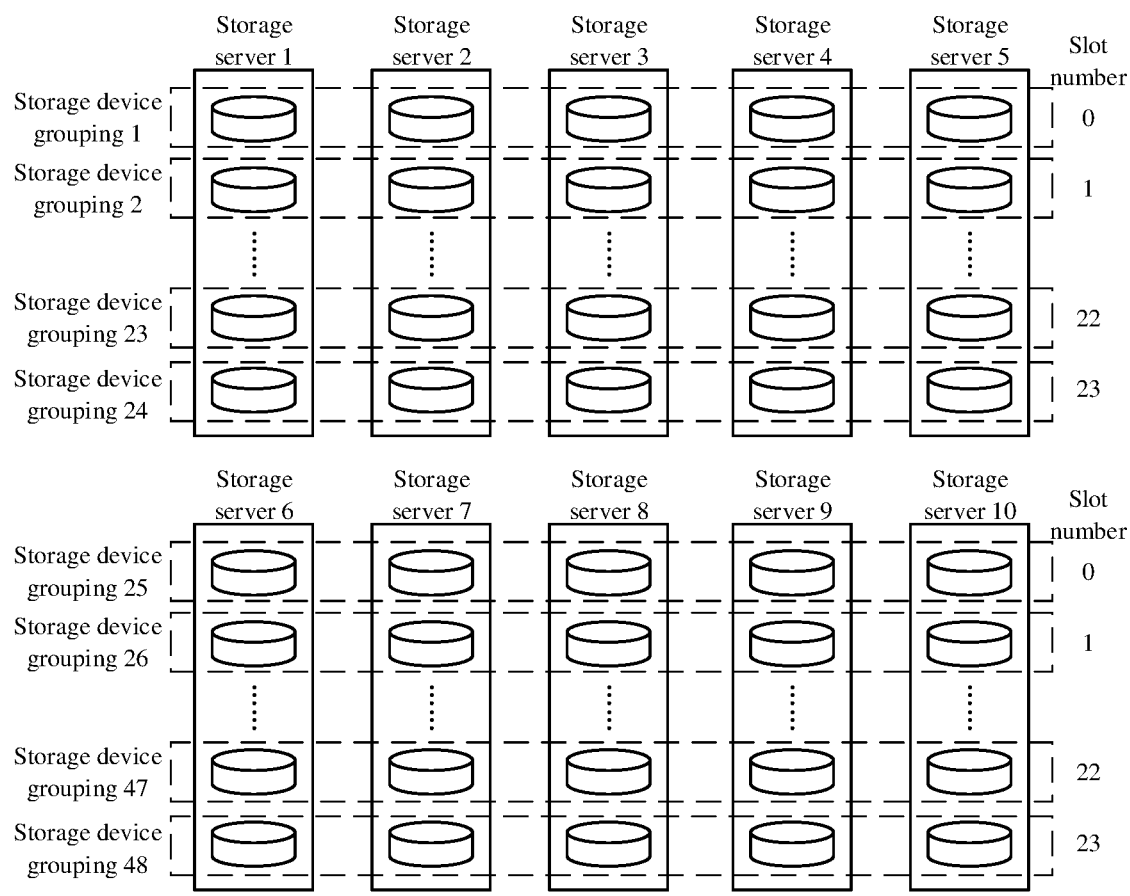
FIG. 4 is a schematic diagram of a storage device grouping according to an exemplary embodiment.

The grouping may also be performed under the combination of the aforesaid two principles. That is, storage devices having a same slot number in a preset number of storage servers are divided into one storage device grouping. As shown in FIG. 4 that is a schematic diagram of the storage device groups, for 10 storage servers, the storage devices in slot 0 in the first 5 storage servers may be divided into one group, the storage devices in slot 1 may be divided into one group, and so on, such that a total of 48 storage device groupings may be obtained since 24 storage device groups are obtained in the first 5 storage servers and 24 storage device groups are also obtained in the last 5 storage servers similarly.

The specific method for dividing the storage devices groupings may be selected by technicians as needed, which is not limited herein.

In step 102, a target storage device grouping for storing the target data is determined among a plurality of preset storage device groupings.

In one possible implementation, the management server may store the target data in a specified target storage device grouping. The target storage device grouping may be a target storage device grouping allocated to the target data in real time while receiving the storage request of the target data, and may also be a target storage device grouping that has been allocated to the target data before receiving the storage request of the target data. For example, the management server may sort the storage device groupings, and when the management server receives the storage request carrying the target data, the storage device grouping ranked first is determined as the target storage device grouping, which is not limited herein.

Optionally, for the video data of the monitoring points, the target storage device grouping corresponding to the target monitoring point may be determined according to a corresponding relationship between the monitoring points and the storage device groups.

In one possible implementation, after receiving the storage request, the management server may read identification of the target monitoring point in the storage request. Then, the target storage device grouping corresponding to the target monitoring point is determined according to the corresponding relationship between the monitoring points and the storage device groups that has been stored in the aforesaid process. In the case that the corresponding relationship between the monitoring points and the storage device groupings is in the form of a table, the target storage device grouping corresponding to the target monitoring point may be searched in the corresponding relationship table between the monitoring points and the storage device groupings. In the case that the corresponding relationship between the monitoring points and the storage device groups is in the form of a function, such as a hash algorithm, the corresponding target storage device grouping may be obtained by calculating the identification of the target monitoring point according to the function between the monitoring points and the storage device groups.

Optionally, before determining the target storage device grouping corresponding to the target monitoring point, the management server may query whether a target corresponding relationship between the target monitoring point and the corresponding storage device grouping exists in the corresponding relationship between the monitoring points and the storage device groupings that has been stored. That is, the management server queries whether a corresponding target storage device grouping is preset for the target monitoring point, and a subsequent processing may be as follows: determining, in the case that the target corresponding relationship exists, the target storage device grouping corresponding to the target monitoring point according to the target corresponding relationship; and determining, in the case that the target corresponding relationship does not exist, the target storage device grouping corresponding to the target monitoring point according to the number of monitoring points corresponding to each storage device grouping, and storing the target corresponding relationship between the target monitoring point and the target storage device grouping into the corresponding relationship between the monitoring points and the storage device groups.

In one possible implementation, the management server may not establish the corresponding relationship between the monitoring points and the storage device groups for all monitoring points in advance, but only establish, when receiving video data of a certain monitoring point for the first time, the corresponding relationship between the monitoring points and the storage device groups for the monitoring point.

While storing the data of the target monitoring point, in the case that the management server queries that the target corresponding relationship between the target monitoring point and the corresponding storage device grouping exists in the corresponding relationship between the monitoring points and the storage device groups that has been stored, it indicates that the video data of the target monitoring point that has already been stored in the target storage device grouping, and then the target storage device grouping corresponding to the target monitoring point may be determined according to the target corresponding relationship. The specific determination process has been introduced above, which is not described herein any further. In this way, the data of a same monitoring point may be stored in a same storage device grouping.

In the case that the target corresponding relationship between the target monitoring point and the corresponding storage device grouping does not exist in the corresponding relationship between the monitoring points and the storage device groupings that has been stored, it indicates that the video data of the target monitoring point is stored for the first time, and the management server may determine the number of the monitoring points in each storage device grouping. Then, the target storage device grouping corresponding to the target monitoring point may be determined according to the number of the monitoring points corresponding to each storage device grouping. For example, any storage device grouping with the smallest number of monitoring points or any storage device grouping with the number of monitoring points less than a preset threshold may serve as the target storage device grouping corresponding to the target monitoring point. Then, the management server may add the target corresponding relationship between the target monitoring point and the target storage device grouping to the corresponding relationship table that has been stored.

In this way, while adding a new monitoring point, a new corresponding relationship may be added on the basis of the existing corresponding relationships without the need to re-establish all of the corresponding relationships, which thereby improves the flexibility in establishing the corresponding relationship. In addition, by storing the video data of the newly added monitoring points in the storage device grouping having a small number of monitoring points, the balance in the number of monitoring points stored in each storage device grouping can be ensured.

In step 103, for each data stripe, the plurality of data blocks in the data stripe are stored into different storage devices in the target storage device grouping respectively.

In one possible implementation, after determining the target storage device grouping, the management server may select a storage device for storing each data block of the target data stripe from the target storage device grouping. Generally, different data blocks are stored in different storage devices. Then, the management server may send each data block to the storage server corresponding to the storage device for storing respectively, and further send the identification of the corresponding storage device at the same time. The storage server may then store the received data block into the corresponding storage device. In this way, for the video data of the monitoring points, the video data of the target monitoring point may only be stored in the target storage device grouping, such that the video data of the target monitoring point may not be affected when the storage device outside the target storage device grouping is corrupted.

Optionally, after storing the data blocks, the management server may record storage device storing each of the data blocks to obtain the corresponding relationship between the data blocks and the storage devices.

In one possible implementation, the storage location of the data block needs to be recorded in order to facilitate subsequent data retrieval or recovery. After storing the data block, the management server may record the storage device storing each data block to obtain and store the corresponding relationship between the data blocks and the storage devices. The corresponding relationship may be in the form of a table or other forms, which is not limited herein.

Optionally, when the storage device is corrupted, the data blocks that meet the recovery condition may be obtained by calculating other data blocks in the corresponding data strip, and the corresponding processing may be as follows: receiving a data recovery request corresponding to a target storage device that is corrupted; determining a target data block that is corrupted corresponding to the target storage device according to the corresponding relationship between the data blocks and the storage devices; and recovering the target data block according to other data blocks, except the target data block, in the target data stripe to which the target data block belongs, and storing a recovered target data block into a new storage device.

The new storage device may be a storage device installed in the slot of the target storage device to replace the target storage device.

In one possible implementation, when the storage device is detected to be corrupted, the technicians may remove the storage device that is corrupted from the slot and replace it with the new storage device. Alternatively, when the entire storage server has a failure, a new storage server may be used to replace the failed storage server. While detecting that the storage device or the storage server is replaced or a technician performs a corresponding replacement operation on the management server, the management server may trigger a data recovery request corresponding to the target storage device that is corrupted. Then, the management server may search for the data block stored in the target storage device according to the corresponding relationship between the data blocks and the storage devices. Because the target storage device is corrupted, the data blocks stored therein are also corrupted. While, according to characteristics of the erasure coding technology, the lost data block may be obtained by calculating the remaining data blocks in the case that the number of the data blocks that are corrupted in a data stripe is less than M. In practice, there may be more than one storage device that is corrupted. Thus, it is necessary to determine a recoverable data block based on the data blocks that are corrupted, and the recoverable data block is namely the target data block.

Then, the management server may obtain other data blocks in the target data stripe to which the target data block belongs, and search for the storage device that stores the other data blocks according to the corresponding relationship between the data blocks and the storage devices. Furthermore, the management server may send a request of retrieving the other data blocks to the storage servers to which each of the storage devices as searched belongs, and then the storage server may send the other data blocks as retrieved to the management server. After receiving the other data blocks in the target data stripe, the management server may calculate the target data blocks that are corrupted, that is, recover the target data block. Then, a recovered target data block may be sent to the corresponding storage server, and the storage server may store the target data block in the new storage device.

After the aforesaid process, in the case that no more than M storage devices are corrupted in one storage device grouping, the data block that is corrupted can be recovered and no effect is caused on the data stored in the storage device grouping. For the entire storage system, as long as the number of the corrupted storage devices in each storage device grouping does not exceed M, it may be ensured that the data of the entire storage system are not affected even if the total number of the corrupted storage devices exceeds M, which thereby improves the tolerance of the storage system for bad discs. For example, assuming that (M+1) storage devices are corrupted, the probability of corrupting (M+1) storage devices in the same storage device grouping is less than the probability of corrupting (M+1) storage devices in the entire system, and the unrecoverable data corruption can only be caused by the corruptions to (M+1) storage devices in the same storage device grouping. In other words, under a similar circumstance of corrupting more than M storage devices, the probability of the unrecoverable data corruption will be greatly reduced in the case that the data blocks are stored according to the storage device groupings.

Moreover, even if the number of corrupted storage devices in a storage device grouping exceeds M and an unrecoverable corruption is caused to some data stripes, what is affected is merely the video data of the monitoring point corresponding to the storage device grouping rather than the video data of the monitoring points stored in other storage device groupings, such that the probability of corrupting the video data is greatly reduced, which means a lot for the security videos. In the process of recovering data of a certain data stripe, only the uncorrupted data is retrieved from other storage devices in the storage device grouping corresponding to the data stripe, and it is unnecessary to retrieve the data from all the storage devices in the storage system, such that the occupation of network transmission bandwidth can be reduced, and the working pressure of the storage devices in the storage system can be reduced, which ensures the operation of the storage system.

In the embodiments of the present disclosure, the management server receives a storage request carrying the target data; determines, among the plurality of the preset storage device groupings, the target storage device grouping for storing the target data; and stores, for each data stripe, the plurality of data blocks in the data stripe into different storage devices in the target storage device grouping respectively. In this way, the data can only be affected when the number of corrupted storage devices in a storage device grouping exceeds M rather than when the number of corrupted storage devices in the entire storage system exceeds M. In addition, the probability that the number of corrupted storage devices exceeds the number of parity data blocks in a storage device grouping is less than the probability that the number of corrupted storage devices exceeds the number of parity data blocks in the entire storage system, such that the risk of data loss is reduced.

Figure 5:
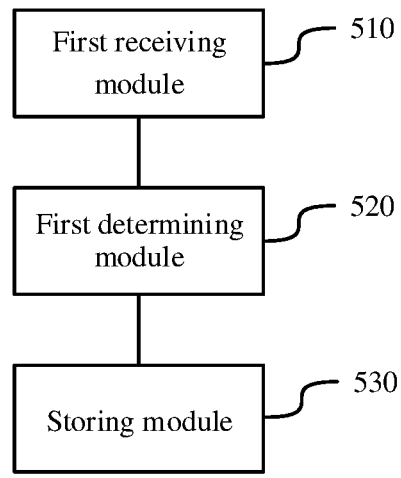
FIG. 5 is a schematic diagram of an apparatus for storing data according to an exemplary embodiment.

Another embodiment of the present disclosure provides an apparatus for storing data. The apparatus may be the management server in the above embodiment, and may include a first receiving module 510, a first determining module 520, a storing module 530 as shown in FIG. 5.

The first receiving module 510 is configured to receive a storage request carrying target data, wherein the target data includes at least one data stripe, each data stripe including a plurality of data blocks.

The first determining module 520 is configured to determine, among a plurality of preset storage device groupings, a target storage device grouping for storing the target data.

The storing module 530 is configured to store, for each data stripe, the plurality of data blocks in the data stripe into different storage devices in the target storage device grouping respectively.

Optionally, the first receiving module 510 is configured to receive a storage request carrying the target data of a target monitoring point; and the first determining module 520 is configured to determine a target storage device grouping corresponding to the target monitoring point according to a corresponding relationship between monitoring points and storage device groupings.

Optionally, the first determining module 520 is configured to:

search for the target storage device grouping corresponding to the target monitoring point in a corresponding relationship table between the monitoring points and the storage device groupings; or determine the target storage device grouping corresponding to the target monitoring point according to a function between the monitoring points and the storage device groupings.

Optionally, the first determining module 520 is configured to:

query whether a target corresponding relationship between the target monitoring point and a corresponding storage device grouping exists in the corresponding relationship between the monitoring points and the storage device groupings that has been stored;

determine, in the case that the target corresponding relationship exists, the target storage device grouping corresponding to the target monitoring point according to the target corresponding relationship; and determine, in the case that the target corresponding relationship does not exist, the target storage device grouping corresponding to the target monitoring point according to the number of monitoring points corresponding to each storage device grouping, and store the target corresponding relationship between the target monitoring point and the target storage device grouping in the corresponding relationship between the monitoring points and the storage device groups.

Figure 6:
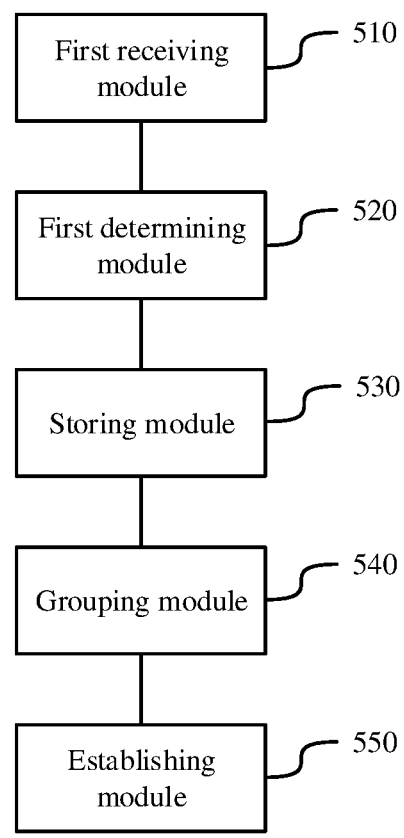
FIG. 6 is a schematic diagram of an apparatus for storing data according to an exemplary embodiment.

Optionally, as shown in FIG. 6, the apparatus further includes a grouping module 540 and an establishing module 550.

The grouping module 540 is configured to group, based on a preset rule, all the storage devices to obtain the plurality of storage device groupings;

The establishing module 550 is configured to establish and store the corresponding relationship between the monitoring points and the storage device groupings.

Optionally, the grouping module 540 is configured to:

take all storage devices having a same slot number in each storage server into a storage device grouping to obtain the plurality of storage device groupings; or take all storage devices in a first preset number of storage servers into a storage device grouping to obtain the plurality of storage device groupings; or take all storage devices having a same slot number in a second preset number of storage servers into a storage device grouping to obtain the plurality of storage device groupings.

Optionally, the grouping module 540 is configured to select a storage device randomly from each storage server to constitute a storage device grouping and thereby obtain the plurality of storage device groupings.

Figure 7:
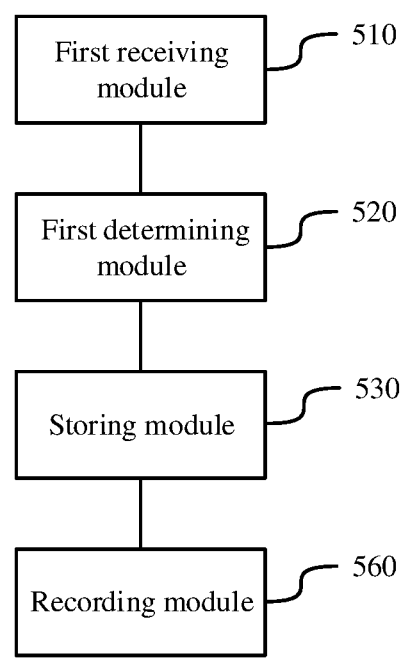
FIG. 7 is a schematic diagram of an apparatus for storing data according to an exemplary embodiment.

Optionally, as shown in FIG. 7, the apparatus further includes a recording module 560.

The recording module 560 is configured to record the storage device storing each data block to obtain a corresponding relationship between the data blocks and the storage devices.

Figure 8:
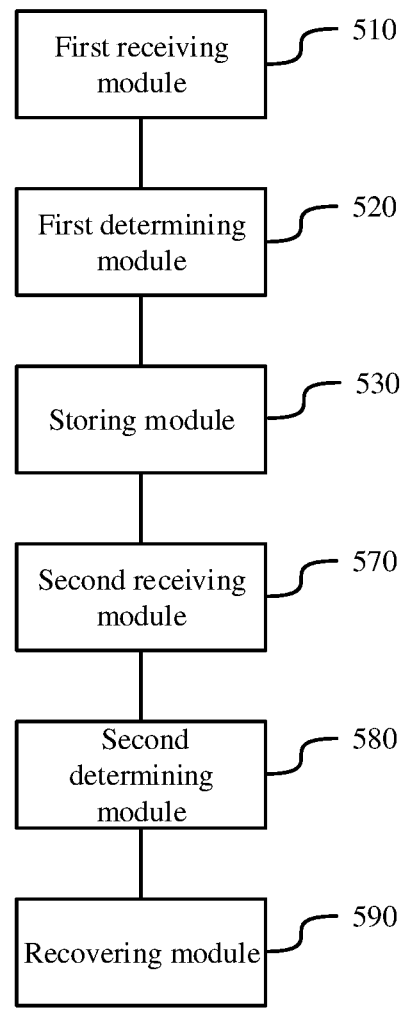
FIG. 8 is a schematic diagram of an apparatus for storing data according to an exemplary embodiment.

Optionally, as shown in FIG. 8, the apparatus further includes a second receiving module 570, a second determining module 580, a recovering module 590.

The second receiving module 570 is configured to receive a data recovery request corresponding to a target storage device that is corrupted.

The second determining module 580 is configured to determine a target data block that is corrupted corresponding to the target storage device according to the corresponding relationship between the data blocks and the storage devices;

The recovering module 590 is configured to recover the target data block according to other data blocks, except the target data block, in the target data stripe to which the target data block belongs, and store a recovered target data block into a new storage device.

With respect to the apparatus in the forgoing described embodiments, the specific manner in which the respective modules perform the operations has been described in detail in the embodiments of the method, which is not described herein any further.

In the embodiments of the present disclosure, the management server receives a storage request carrying the target data, determines, among the plurality of the preset storage device groupings, the target storage device grouping for storing the target data, and stores, for each data stripe, the plurality of data blocks in the data stripe into different storage devices in the target storage device grouping respectively. In this way, the data can only be affected when the number of corrupted storage devices in a storage device grouping exceeds M rather than when the number of corrupted storage devices in the entire storage system exceeds M. In addition, the probability that the number of corrupted storage devices exceeds the number of parity data blocks in a storage device grouping is less than the probability that the number of corrupted storage devices exceeds the number of parity data blocks in the entire storage system, such that the risk of data loss is reduced.

It should be noted that the division of respective functional modules is taken as an example for illustration when the apparatus for storing data according to the above embodiments stores data. In practice, the above functions may be distributed to different functional modules according to needs. That is, the internal structure of the management server is divided into different functional modules to complete all or a part of the functions described above. In addition, the embodiments of the apparatus for storing data are based on same inventive concept as the embodiments of the method for storing data according to the above embodiments. Reference is made to the method embodiments for the specific implementation process, which is not described herein any further.

Another exemplary embodiment shows a schematic diagram of a structure of a management server 900.

Figure 9:
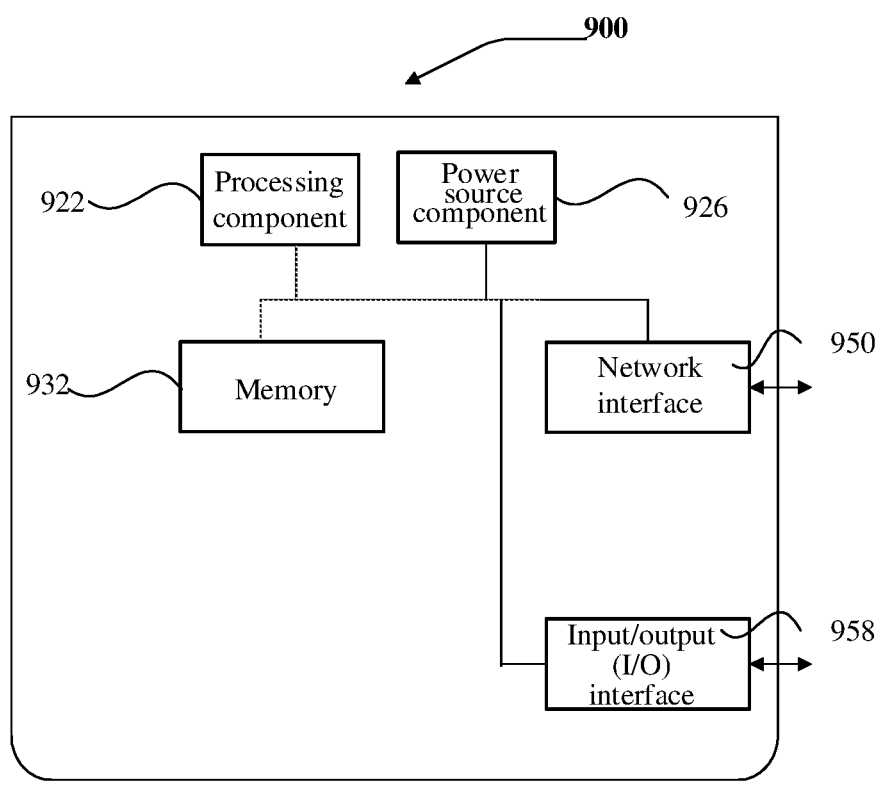
FIG. 9 is a schematic diagram of a structure of a management server according to an exemplary embodiment.

Referring to FIG. 9, the management server 900 includes a processing component 922, which further includes one or more processors, and memory resources represented by a memory 932 for storing instructions executable by the processing component 922, for example an application program. The application program stored in the memory 932 may include one or more modules, each of which corresponds to a set of instructions. Further, the processing component 922 is configured to execute instructions to perform the above method for storing data.

The management server 900 may also include a power source component 926 configured to perform power source management of the management server 900, a wired or wireless network interface 950 configured to connect the management server 900 to the network, and an input/output (I/O) interface 958. The management server 900 can operate an operating system stored in the memory 932, such as Windows Server™, Mac OS X™, Unix™, Linux™, FreeBSD™ or the like.

The management server 900 may include a memory and one or more programs, wherein the one or more programs are stored in the memory and configured to be executed by one or more processors. The one or more programs include instructions for performing the following operations:

receiving a storage request carrying target data, wherein the target data includes at least one data stripe, each data stripe including a plurality of data blocks;

determining, among a plurality of preset storage device groups, a target storage device grouping for storing the target data; and storing, for each data stripe, the plurality of data blocks in the data stripe into different storage devices in the target storage device grouping respectively.

Optionally, receiving the storage request carrying the target data includes:

receiving a storage request carrying target data of a target monitoring point;

determining, among the plurality of preset storage device groups, the target storage device grouping for storing the target data includes:

determining a target storage device grouping corresponding to the target monitoring point according to a corresponding relationship between monitoring points and storage device groupings.

Optionally, determining the target storage device grouping corresponding to the target monitoring point according to the corresponding relationship between the monitoring points and the storage device groupings includes:

searching for the target storage device grouping corresponding to the target monitoring point in a corresponding relationship table between the monitoring points and the storage device groupings;

or, determining the target storage device grouping corresponding to the target monitoring point according to a function between the monitoring points and the storage device groupings.

Optionally, determining the target storage device grouping corresponding to the target monitoring point according to the corresponding relationship between the monitoring points and the storage device groupings includes:

querying whether a target corresponding relationship between the target monitoring point and the corresponding storage device grouping exists in the corresponding relationship between the monitoring points and the storage device groupings that has been stored;

determining, in the case that the target corresponding relationship exists, the target storage device grouping corresponding to the target monitoring point according to the target corresponding relationship; and the method further includes:

determining, in the case that the target corresponding relationship does not exist, the target storage device grouping corresponding to the target monitoring point according to a number of monitoring points corresponding to each storage device grouping, and storing the target corresponding relationship between the target monitoring point and the target storage device grouping in the corresponding relationship between the monitoring points and the storage device groups.

Optionally, before receiving the storage request carrying the target data of the target monitoring point, the method further includes:

grouping, based on a preset rule, all the storage devices to obtain a plurality of storage device groupings; and establishing and storing the corresponding relationship between the monitoring points and the storage device groupings.

Optionally, grouping, based on the preset rule, all the storage devices to obtain the plurality of storage device groupings includes:

taking all storage devices having a same slot number in each storage server into a storage device grouping to obtain the plurality of storage device groupings; or taking all storage devices in a first preset number of storage servers into a storage device grouping to obtain the plurality of storage device groupings; and taking all storage devices having a same slot number in a second preset number of storage servers into a storage device grouping to obtain the plurality of storage device groupings.

Optionally, grouping, based on the preset rule, all the storage devices to obtain the plurality of storage device groupings includes:

selecting a storage device randomly from each storage server to constitute a storage device grouping and thereby obtain the plurality of storage device groupings.

Optionally, after storing, for each data stripe, the plurality of data blocks in the data stripe into different storage devices in the target storage device grouping respectively, the method further includes:

recording the storage device storing each data block to obtain a corresponding relationship between the data blocks and the storage devices.

Optionally, after recording the storage device storing each data block to obtain the corresponding relationship between the data blocks and the storage devices, the method further includes:

receiving a data recovery request corresponding to a target storage device that is corrupted;

determining a target data block that is corrupted corresponding to the target storage device according to the corresponding relationship between the data blocks and the storage devices; and recovering the target data block according to other data blocks, except the target data block, in the target data stripe to which the target data block belongs, and storing a recovered target data block into a new storage device.

In the embodiments of the present disclosure, the management server receives a storage request carrying the target data, determines, among the plurality of the preset storage device groupings, the target storage device grouping for storing the target data, and stores, for each data stripe, the plurality of data blocks in the data stripe into different storage devices in the target storage device grouping respectively. In this way, the data can only be affected when the number of corrupted storage devices in a storage device grouping exceeds M rather than when the number of corrupted storage devices in the entire storage system exceeds M. In addition, the probability that the number of corrupted storage devices exceeds the number of parity data blocks in a storage device grouping is less than the probability that the number of corrupted storage devices exceeds the number of parity data blocks in the entire storage system, such that the risk of data loss is reduced.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure be only subject to the appended claims.

What is claimed is:

1. A method for storing data, comprising:
receiving a storage request carrying target data, wherein the target data comprises at least one data stripe, each data stripe comprising a plurality of data blocks;
determining, among a plurality of preset storage device groupings, a target storage device grouping for storing the target data; and
storing, for each data stripe, the plurality of data blocks in the data stripe into different storage devices in the target storage device grouping respectively;
wherein the plurality of preset storage device groupings are obtained by taking all storage devices having a same slot number in each of storage servers into a storage device grouping, by taking all storage devices in a first preset number of storage servers into a storage device grouping, or, by taking all storage devices having a same slot number in a second preset number of storage servers into a storage device grouping.

2. The method according to claim 1, wherein receiving the storage request carrying the target data comprises:
receiving a storage request carrying target data of a target monitoring point;
determining, among the plurality of preset storage device groupings, the target storage device grouping for storing the target data comprises:
determining a target storage device grouping corresponding to the target monitoring point according to a corresponding relationship between monitoring points and storage device groupings.

3. The method according to claim 2, wherein determining the target storage device grouping corresponding to the target monitoring point according to the corresponding relationship between the monitoring points and the storage device groupings comprises one of the following steps:
searching for the target storage device grouping corresponding to the target monitoring point in a corresponding relationship table between the monitoring points and the storage device groupings; and
determining the target storage device grouping corresponding to the target monitoring point according to a function between the monitoring points and the storage device groupings.

4. The method according to claim 2, wherein determining the target storage device grouping corresponding to the target monitoring point according to the corresponding relationship between the monitoring points and the storage device groupings comprises:
querying whether a target corresponding relationship between the target monitoring point and a corresponding storage device grouping exists in the corresponding relationship between the monitoring points and the storage device groupings that has been stored; and
determining, in the case that the target corresponding relationship exists, the target storage device grouping corresponding to the target monitoring point according to the target corresponding relationship; and
the method further comprises:
determining, in the case that the target corresponding relationship does not exist, the target storage device grouping corresponding to the target monitoring point according to a number of monitoring points corresponding to each storage device grouping, and storing the target corresponding relationship between the target monitoring point and the target storage device grouping in the corresponding relationship between the monitoring points and the storage device groupings.

5. The method according to claim 2, wherein before receiving the storage request carrying the target data of the target monitoring point, the method further comprises:
grouping, based on a preset rule, all the storage devices to obtain the plurality of storage device groupings; and
establishing and storing the corresponding relationship between the monitoring points and the storage device groupings.

6. The method according to claim 1, wherein after storing, for each data stripe, the plurality of data blocks in the data stripe into different storage devices in the target storage device grouping respectively, the method further comprises:
recording the storage device storing each data block to obtain a corresponding relationship between the data blocks and the storage devices.

7. The method according to claim 6, wherein after recording the storage device storing each data block to obtain the corresponding relationship between the data blocks and the storage devices, the method further comprises:
receiving a data recovery request corresponding to a target storage device that is corrupted;
determining a target data block that is corrupted corresponding to the target storage device according to the corresponding relationship between the data blocks and the storage devices; and
recovering the target data block according to other data blocks, except the target data block, in the target data stripe to which the target data block belongs, and storing a recovered target data block into a new storage device.

8. A management server, comprising: a processor and a memory that stores at least one instruction therein, wherein the processor, when loading and executing the at least one instruction, is enabled to perform the method as defined in claim 1.

9. A non-transitory computer-readable storage medium storing at least one instruction therein, wherein the at least one instruction, when loaded and executed by a processor, enables the processor to perform the method as defined in claim 1.

10. An apparatus for storing data, comprising:
a processor; and
a memory for storing instructions executable by the processor, wherein
the processor is configured to:
receive a storage request carrying target data, the target data comprising at least one data stripe, each data stripe comprising a plurality of data blocks;
determine, among a plurality of preset storage device groupings, a target storage device grouping for storing the target data; and
store, for each data stripe, the plurality of the data blocks in the data stripe into different storage devices in the target storage device grouping, respectively;
wherein the plurality of preset storage device groupings are obtained by taking all storage devices having a same slot number in each of storage servers into a storage device grouping, by taking all storage devices in a first preset number of storage servers into a storage device grouping, or, by taking all storage devices having a same slot number in a second preset number of storage servers into a storage device grouping.

11. The apparatus according to claim 10, wherein in order to receive the storage request carrying the target data, the processor is configured to:
  receive a storage request carrying the target data of a target monitoring point; and
  in order to determine, among the plurality of preset storage device groupings, the target storage device grouping for storing the target data, the processor is configured to:
  determine a target storage device grouping corresponding to the target monitoring point according to a corresponding relationship between monitoring points and storage device groupings.

12. The apparatus according to claim 11, wherein in order to determine the target storage device grouping corresponding to the target monitoring point according to the corresponding relationship between the monitoring points and the storage device groupings, the processor is configured to execute one of the following:
  searching for the target storage device grouping corresponding to the target monitoring point in a corresponding relationship table between the monitoring points and the storage device groupings; and
  determining the target storage device grouping corresponding to the target monitoring point according to a function between the monitoring points and the storage device groupings.

13. The apparatus according to claim 11, wherein in order to determine the target storage device grouping corresponding to the target monitoring point according to the corresponding relationship between the monitoring points and the storage device groupings, the processor is configured to:
  query whether a target corresponding relationship between the target monitoring point and the corresponding storage device grouping exists in the corresponding relationship between the monitoring points and the storage device groupings that has been stored;
  determine, in the case that the target corresponding relationship exists, the target storage device grouping corresponding to the target monitoring point according to the target corresponding relationship; and
  determine, in the case that the target corresponding relationship does not exist, the target storage device grouping corresponding to the target monitoring point according to a number of monitoring points corresponding to each storage device grouping, and store the target corresponding relationship between the target monitoring point and the target storage device grouping in the corresponding relationship between the monitoring points and the storage device groupings.

14. The apparatus according to claim 11, the processor is further configured to:
  group, based on a preset rule, all the storage devices to obtain the plurality of storage device groupings; and
  establish and store the corresponding relationship between the monitoring points and the storage device groupings.

15. The apparatus according to claim 10, the processor is further configured to:
  record the storage device storing each data block to obtain a corresponding relationship between the data blocks and the storage devices.

16. The apparatus according to claim 15, the processor is further configured to:
  receive a data recovery request corresponding to a target storage device that is corrupted;
  determine a target data block that is corrupted corresponding to the target storage device according to the corresponding relationship between the data blocks and the storage devices; and
  recover the target data block according to other data blocks, except the target data block, in the target data stripe to which the target data block belongs, and store a recovered target data block into a new storage device.

* * * * *